United States Patent
Witting

(10) Patent No.: US 9,828,703 B2
(45) Date of Patent: Nov. 28, 2017

(54) APPARATUS AND METHOD FOR PREPARING COATED CABLE FOR A CABLE CONVEYOR SYSTEM

(71) Applicant: Intraco, Inc., Oskaloosa, IA (US)

(72) Inventor: Craig L. Witting, Keosauqua, IA (US)

( * ) Notice: Subject to any disclaimer, the term of this patent is extended or adjusted under 35 U.S.C. 154(b) by 166 days.

(21) Appl. No.: 14/789,076

(22) Filed: Jul. 1, 2015

(65) Prior Publication Data

US 2017/0005459 A1  Jan. 5, 2017

(51) Int. Cl.
*B65G 19/24* (2006.01)
*D02J 3/00* (2006.01)
*B65G 19/14* (2006.01)

(52) U.S. Cl.
CPC ............... *D02J 3/00* (2013.01); *B65G 19/14* (2013.01)

(58) Field of Classification Search
CPC ......... B65G 19/14; B65G 19/24; B65G 19/16
USPC .............................................. 198/725–735.6
See application file for complete search history.

(56) References Cited

U.S. PATENT DOCUMENTS

| 2,586,538 | A | * | 2/1952 | Hapman | B65G 19/16 198/716 |
| 2,595,941 | A | * | 5/1952 | Hapman | B65G 19/16 198/733 |
| 2,667,962 | A | * | 2/1954 | Hapman | B65G 19/16 198/733 |
| 3,586,155 | A | * | 6/1971 | Turrentine | B65G 19/14 119/901 |
| 4,071,136 | A | | 1/1978 | Jones | |
| 4,195,725 | A | | 4/1980 | Jones | |
| 4,391,361 | A | | 7/1983 | Hall | |
| 5,186,312 | A | * | 2/1993 | Ambs | B65G 19/14 198/716 |
| 7,267,218 | B1 | | 9/2007 | Van Zee | |
| 9,676,558 | B2 | * | 6/2017 | Hellesoe Dall | B65G 19/14 |

* cited by examiner

*Primary Examiner* — William R Harp
(74) *Attorney, Agent, or Firm* — Sturm & Fix LLP

(57) ABSTRACT

An apparatus and method for preparing coated cable for a cable conveyor system. The apparatus includes a stripping die, a swaging die, and a spacing fixture spaced from each other at a predetermined interval that corresponds to the spacing interval between discs in a cable conveyor system. The apparatus facilitates the method of stripping a section of coating from the coated cable, and securing a barrel to the cable over the stripped section. The barrel acts as an attachment point for molded discs carried on the cable.

7 Claims, 6 Drawing Sheets

APPARATUS AND METHOD FOR PREPARING COATED CABLE FOR A CABLE CONVEYOR SYSTEM

BACKGROUND OF THE INVENTION

Field of the Invention

This invention relates to the field of cable conveyors, and more particularly to an apparatus and method for preparing coated cable for secure attachment of conveyor discs.

Description of the Related Art

Cables, due to their flexibility, have been used in conveyance systems for some time. The usual cable conveyance system comprises an endless cable having disc members or buttons attached thereto at even intervals and having a diameter slightly smaller than a conduit through which the cable and button assembly is pulled.

In U.S. Pat. No. 4,195,725, which is hereby incorporated by reference, a drive unit for a cable conveyor is disclosed, having an improved design allowing the driving wheel to be disposed within the material being conveyed.

In U.S. Pat. No. 4,071,136, which is hereby incorporated by reference, a channel housing is disclosed to replace cable tensioning devices used in previous cable conveyor systems.

In U.S. Pat. No. 4,391,361, which is hereby incorporated by reference, an improved hold-down apparatus for cable conveyors is disclosed.

In each of these examples, the discs are attached to the cable by swaged barrels and are subject to forces that may displace the disc from its proper location on the cable. Barrels are typically attached over the coating on a coated cable, and rely solely on the frictional force between the cable coating and the compressed barrel, and between the compressed coating and the cable for their secure attachment.

The coating under the compressed barrel makes the assembly more susceptible to temperature increases as the coating materials will become weakened at elevated temperatures and decrease the overall force needed to displace the disc. Once a disc becomes displaced the cable can then self destruct causing damage not only to itself but the drive mechanism as well.

As a consequence of the foregoing situation, there has existed a longstanding need for a new and improved apparatus and method for preparing coated cable for a cable conveyor system and the provision of such is a stated objective of the present invention.

BRIEF SUMMARY OF THE INVENTION

Briefly stated, the present invention provides an apparatus and method for preparing coated cable for a cable conveyor system. The apparatus includes a stripping die, a swaging die, and a spacing fixture spaced from each other at a predetermined interval that corresponds to the spacing interval between discs in a cable conveyor system. The apparatus facilitates the method of stripping a section of coating from the coated cable, and securing a barrel to the cable over the stripped section. The barrel acts as an attachment point for molded discs carried on the cable.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
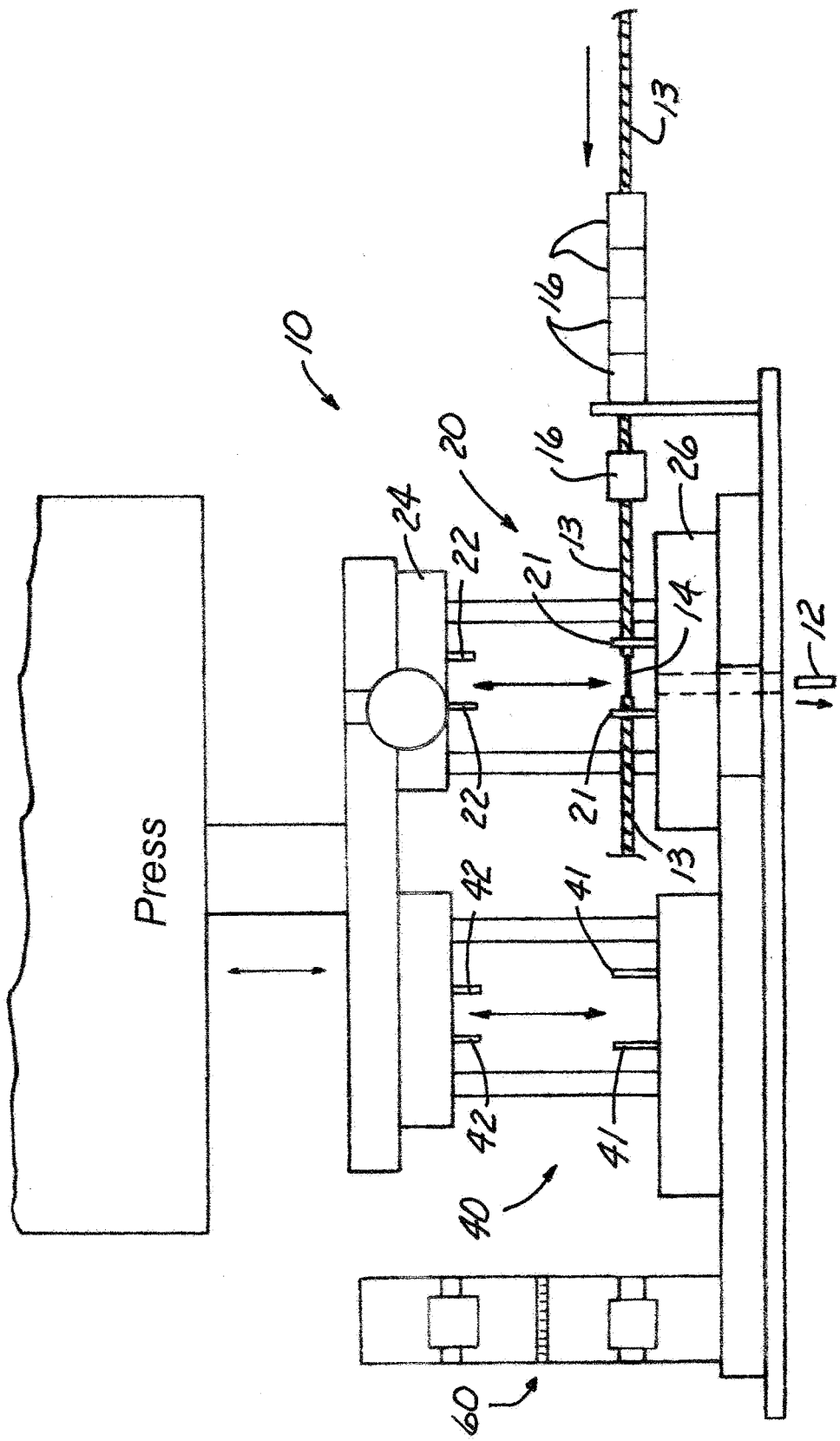
FIG. 1 is a schematic view illustrating the apparatus and method of the present invention, wherein the coated cable is first positioned in the apparatus to strip off a section of coating.

As can be seen by reference to the drawings, and in particularly to FIG. 1, the apparatus for preparing coated cable for a cable conveyor system is designated generally by the reference numeral (10).

Figure 4:
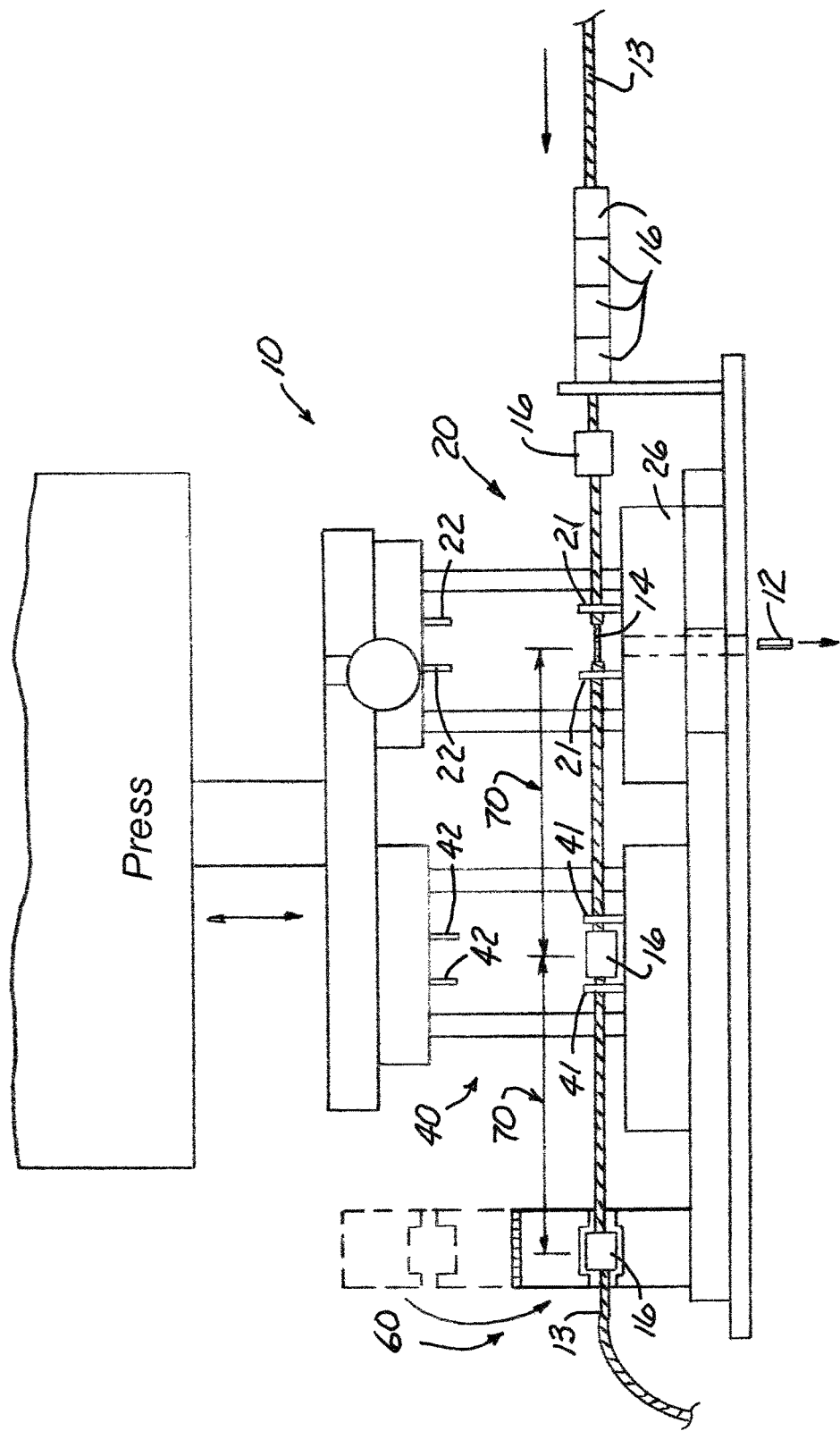
FIG. 4 is a schematic view similar to FIG. 3, but showing the next step wherein the cable is again advanced to the left, and the swaged barrel is positioned in a spacing fixture.

The apparatus (10) includes a cable coating stripping die (20), a barrel swaging die (40), and a spacing fixture (60). The stripping die (20), swaging die (40), and spacing fixture (60) are spaced from each other at a predetermined interval (70) (FIG. 4) that corresponds to the spacing interval between discs (80) in a cable conveyor system.

Figure 8:
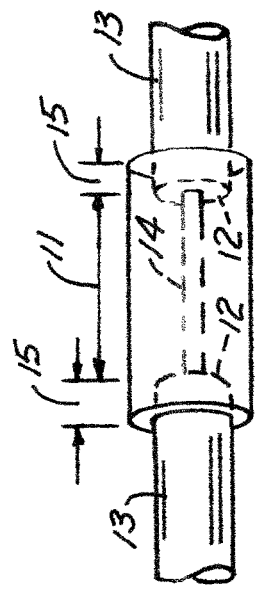
FIG. 8 is a perspective view similar to FIG. 7, showing the barrel positioned over the stripped portion of the cable.
Figure 10:
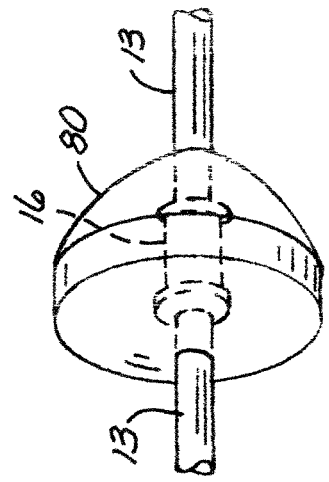
FIG. 10 is a perspective view showing a disc molded to the cable over the swaged barrel.
Figure 9:
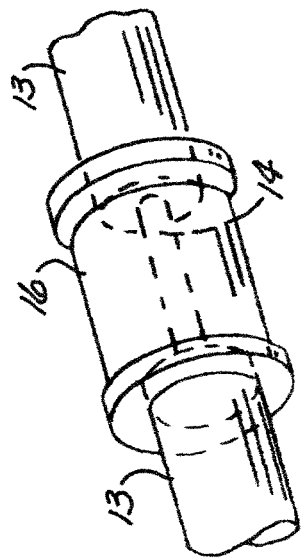
FIG. 9 is a perspective view similar to FIG. 8, but showing the barrel swaged.

The apparatus (10) facilitates the practice of the method of the present invention which is illustrated in FIGS. 6-9, and includes the steps of stripping a section (11) of coating (12) from a coated cable (13) leaving a bare section of wire cable, and securing a metal barrel (16) to the bare cable (14). Also, FIG. 8 shows that the end portions of the barrel (16) extend over portions (15) of the coated cable (13) adjacent the bare wire cable (14). As shown in FIG. 10, the barrel (16) acts as an attachment base between the coated cable (13) and a disc (80) that is molded on the coated cable (13).

The discs (80) are molded after all the barrels (16) are swaged, and this would be true on short lengths of cable. About 20 feet of cable has barrels (16) attached prior to the cable reaching the molding machine. If the cable is 20 feet or shorter, it would all be swaged and then ran through the disc molding machine. If it is longer than 20 feet, which is the case 95% of the time, they are done together. The swaging process is much faster so lengths of cable can be swaged ahead, but the whole cable is not swaged and run through the disc molding machine separately.

As best shown in FIGS. 1-5, coated cable (13) is fed into the apparatus (10) from left to right. The stripping die (20), the swaging die (40), and the spacing fixture all operate simultaneously, once the initial section (11) of coating (12) is stripped and the initial barrel (16) is swaged.

The operation of the stripping die (20) is generally described in the following sequence of operations.

The die (20) is open and the coated cable (13) is loaded into the bottom half die locators (21). As the die (20) begins to close, the top locators (22) meet against the bottom locators (21) trapping the coated cable (13) between both locators (21) and (22). The die (20) continues to close, and as it does the coated cable (13) is guided down into the die (20) by the locators (21) and (22). As the die (20) closes the cable coating (12) is cut. The die (20) is now closed and the cable coating (12) has been fully severed. Air cylinders fire separating the top slides (24). The slides (24) pull the cable coating (12) with their tooth/teeth as they open. Air cylinders fire separating the bottom slides (26) from underneath the coated cable (13). This helps separate the coating (12) from the cable wire (14) and allows a place for the waste coating (12) to go. An air cylinder fires pulling on the top locators (24). As the top locators (24) go up the springs in the bottom locators (26) push them up and the cable wire (14) is pulled with them. This separates the coating (13) from the cable wire (14). The die (20) then returns to the top position and the air cylinders are returned to their start positions.

Figure 2:
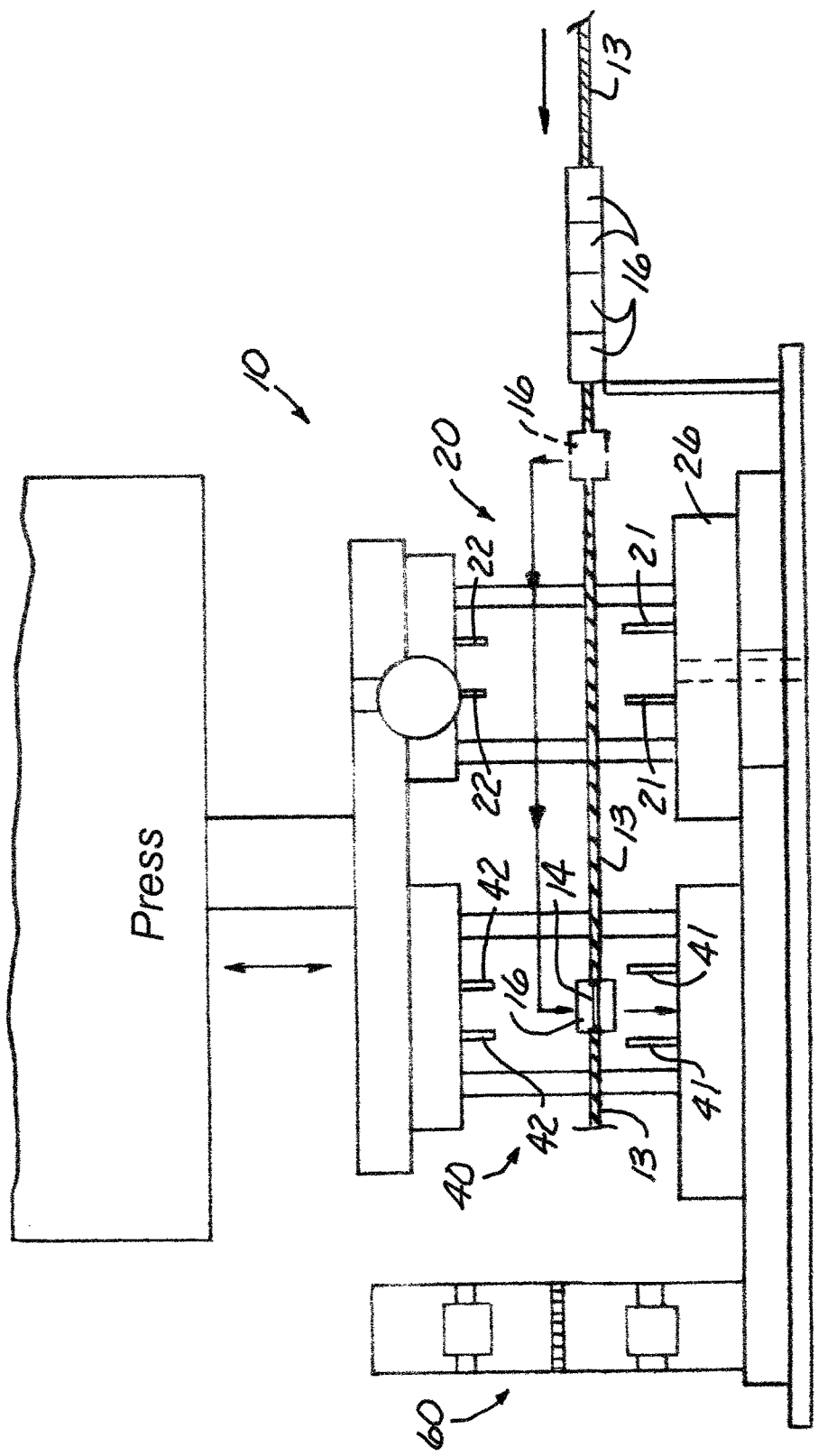
FIG. 2 is a schematic view similar to FIG. 1, but showing the next step wherein the cable is advanced to the left and a metal barrel is positioned over the stripped portion of the cable.
Figure 3:
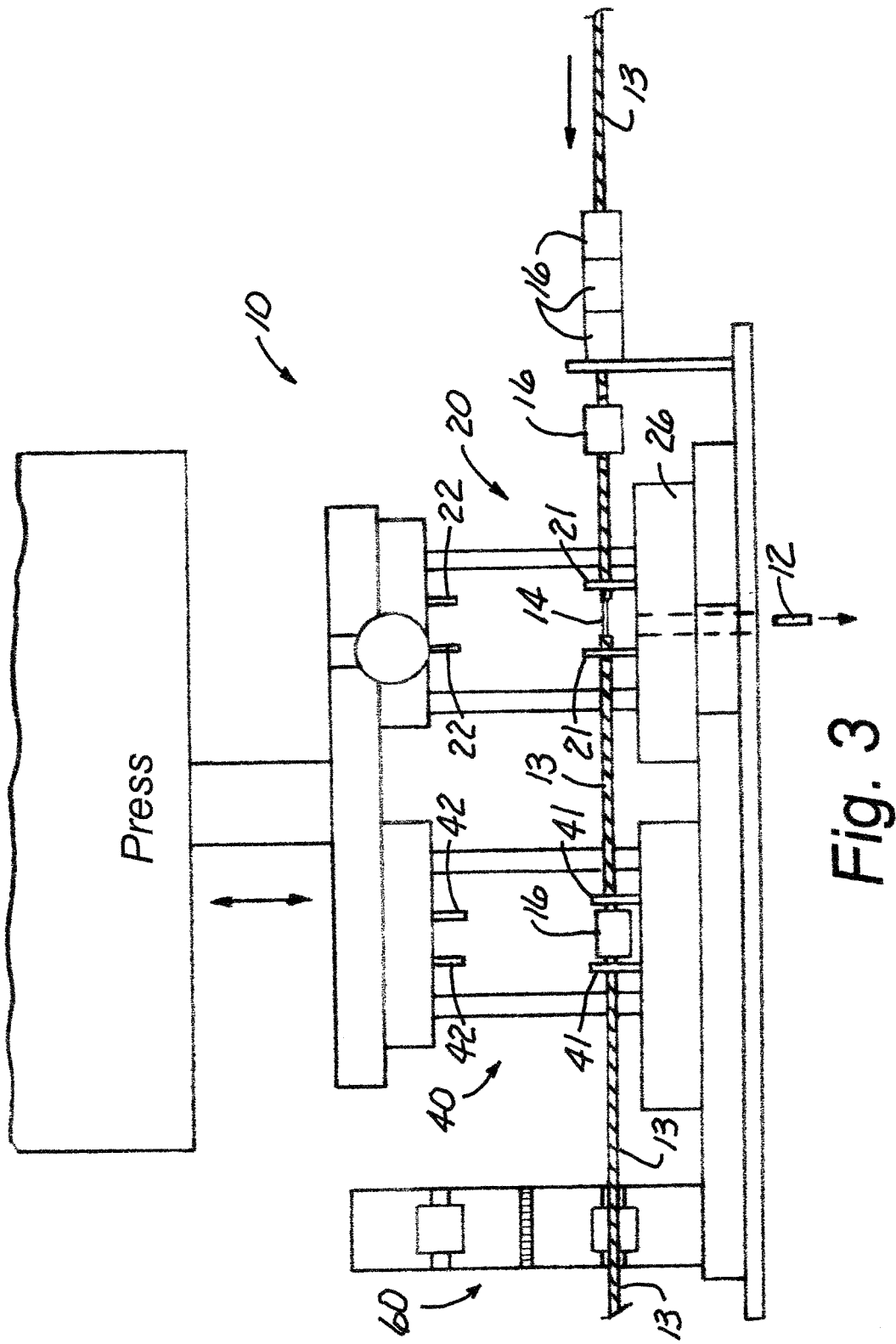
FIG. 3 is a schematic view similar to FIG. 2, but showing the next step wherein the metal barrel is swaged to secure it to the cable.
Figure 5:
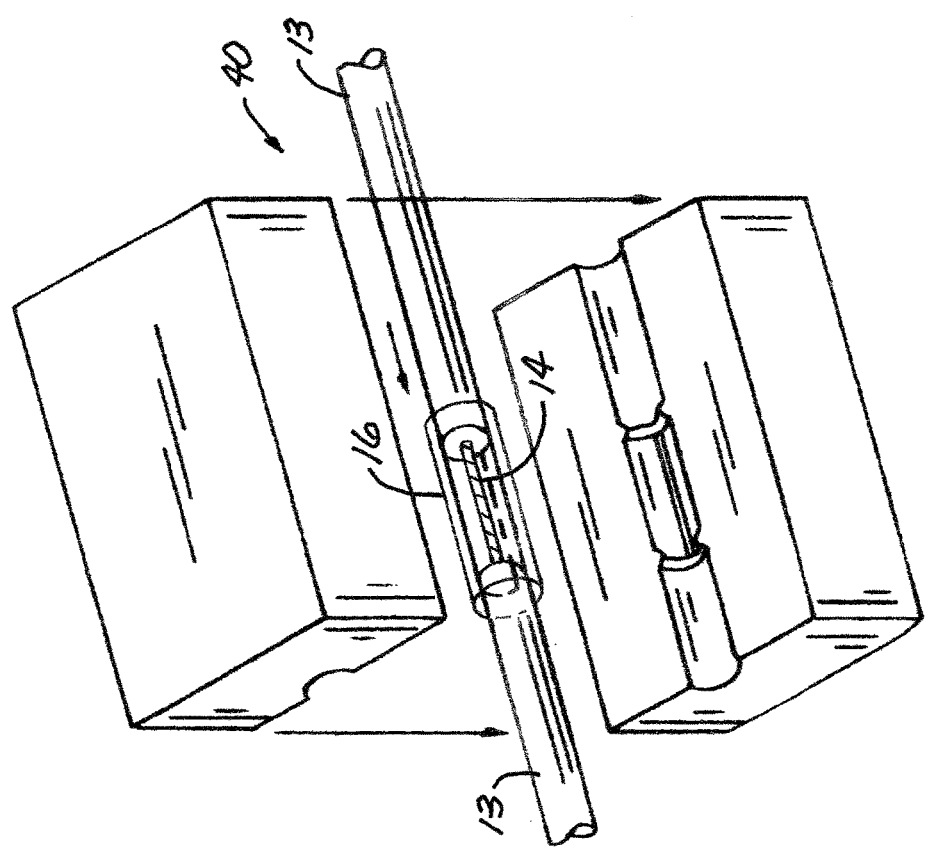
FIG. 5 is a perspective view showing the swaging die.
Figure 7:
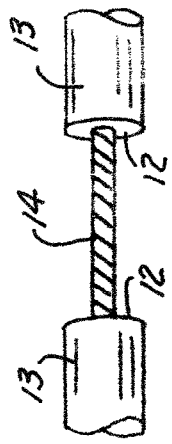
FIG. 7 is a perspective view similar to FIG. 6, but showing the coating removed.
Figure 6:
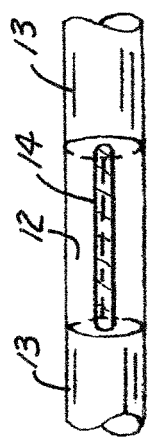
FIG. 6 is a perspective view illustrating the step of cutting the coating from a section of the coated cable.

After the initial section (11) of coating (12) is stripped to expose a section of wire cable (14) (FIGS. 1, 6 and 7), the coated cable (13) is advanced to the left and a metal barrel (16) is placed in position over the stripped section (11) on the swaging die (40) (FIGS. 2 and 5). The barrel (16) is then held in position by the bottom and top locators (41), (42) and swaged to secure it to the wire cable (14) (FIGS. 3 and 9), while the stripping die (20) simultaneously operates to cut the coating (12) at the predetermined interval (70) to the right.

After the initial barrel (16) is swaged, the coated cable (13) is again advanced to the left, and the barrel (16) is placed in the spacing fixture (60) (FIG. 4), and the process continues.

The process of removing the coating from underneath where the cable barrel goes is critical in producing a superior cable conveyor product. By removing a small strip of coating (12) under the barrel (16), the force it takes to displace the disc (80) from its proper location on the coated cable (13) is greatly increased. Applying the barrel (16) over the top of the coating (12) relies solely on the frictional force between the cable coating and the compressed barrel, and between the compressed coating and the cable under pressure of the compressed barrel (16). Removing the coating (12) allows for the barrel (16) to actually bite on the metal of the wire rope (14) giving a consistent grip strength and a higher overall grip strength than relying on a barrel (16) over the coated cable (13). Leaving this coating (12) under the barrel (16) makes the assembly more susceptible to temperature increases as the coating materials (12) will become weakened at elevated temperatures and decrease the overall force needed to displace the disc (80). Once a disc (80) becomes displaced the cable can then self destruct causing damage not only to itself but the drive mechanism as well.

A portion of the coating (12) under the barrel (16) is left on so that even though the coating is cut into many little sections, the barrel (16) helps retain the coating (12) in place and also seals out foreign material as well as keeping the needed lubrication inside. For example, barrels (16) are ½" long, so only ⅜" of coating (12) is removed, leaving ¹⁄₁₆" of coating (12) inside of each end of the barrel (16).

The apparatus of the present invention makes it possible to use the method in a cost effective, efficient and precise manner. By removing the coating (12), applying the barrel (16) and then molding the disc (80) over the barrel (16) the exact placement of each of these members is accomplished, which is critical to the proper function of the cable conveying system. Also removing the coating (12) while not damaging the wire rope (14) that lays underneath is of utmost importance to retain the integrity of the flexible member.

The apparatus and method of the present invention allows a coated cable (13) solution that has a much higher maximum disc adhesion which allows a more reliable and totally sealed assembly. The speed and accuracy of the apparatus contributes to the feasibility of the method and allows a cost competitive, superior product.

Although only an exemplary embodiment of the invention has been described in detail above, those skilled in the art will readily appreciate that many modifications are possible without materially departing from the novel teachings and advantages of this invention. Accordingly all such modifications are intended to be included within the scope of this invention as defined in the following claims.

The invention claimed is:

1. A method of preparing coated cable for a cable conveyor system, the method comprising:
    stripping a section of coating from the coated cable, the stripped section having a predetermined length; and
    securing an attachment base to the cable over the stripped section, wherein the attachment base is a barrel.

2. The method of claim 1, wherein the barrel has a length greater than the length of the stripped section.

3. The method of claim 2, wherein end portions of the barrel extend over portions of the coated cable adjacent the stripped section.

4. The method of claim 1, wherein the barrel is secured to the cable by swaging.

5. The method of claim 4, wherein the swaged barrel has enlarged ends.

6. The method of claim 5, further including securing an enlarged disc to the cable over the barrel.

7. The method of claim 1, further including:
    stripping a subsequent section of coating from the coated cable, wherein an interval between the first and subsequent sections is a predetermined length;
    securing a subsequent barrel to the cable over the subsequent stripped section; and
    repeating the stripping and securing steps.

* * * * *